United States Patent [19]

Klement

[11] Patent Number: 4,459,061

[45] Date of Patent: Jul. 10, 1984

[54] PIVOT PIN ASSEMBLY

[76] Inventor: Larry G. Klement, Rte. 1 - Box 3305, Shawano, Wis. 54166

[21] Appl. No.: 427,091

[22] Filed: Sep. 29, 1982

[51] Int. Cl.³ .......................................... B23P 19/04
[52] U.S. Cl. .................................. 403/163; 403/370; 403/388
[58] Field of Search ............... 403/157, 158, 161, 162, 403/370, 373, 376, 377, 388, 408, 163; 144/34 E

[56] References Cited

U.S. PATENT DOCUMENTS

| | | | |
|---|---|---|---|
| 2,810,597 | 10/1957 | Poss | 403/388 |
| 3,501,183 | 3/1970 | Stratienko | 403/388 |
| 3,525,448 | 8/1970 | Bauer | 403/157 X |
| 3,758,941 | 9/1973 | Jackson et al. | 403/157 X |
| 3,841,771 | 10/1974 | Shankowitz et al. | 403/163 |
| 4,053,244 | 10/1977 | Dively | 403/370 X |
| 4,096,957 | 6/1978 | Iverson et al. | 403/157 |
| 4,097,167 | 6/1978 | Stratienko | 403/370 X |
| 4,268,185 | 5/1981 | Müllenberg | 403/370 X |
| 4,374,628 | 2/1983 | Boone et al. | 403/162 |

Primary Examiner—Dennis L. Taylor
Attorney, Agent, or Firm—Wicks & Nemer

[57] ABSTRACT

A pivot pin assembly according to the teachings of the present invention is shown in use in a mobile tree felling and handling device. A pivot pin is held between first and second support members. In the preferred embodiment, the pivot pin assembly includes first and second bushings having an outside male tapered surface and having an internal bore for slidable receipt on the pivot pin. The bushing in its most preferred form includes a cut which extends through the outside male tapered surface and terminates in the internal bore to split the bushing along a radius to form a caliper-like member having first and second legs with their free ends in a spaced relation. The support members include a female tapered opening having a size and shape complementary to and for receipt of the outside male tapered surface of the bushing. The bushing in its most preferred form further includes a flange through which bolts threadably received in the support member pass so that the outside male tapered surface of the bushing can be drawn into and removably secured in the female tapered opening of the support member. As the bushing is drawn within the female tapered opening of the support members, the first and second legs of the bushing move together such that the outside surface of the pivot pin is gripped by the internal bore of the bushing.

6 Claims, 9 Drawing Figures

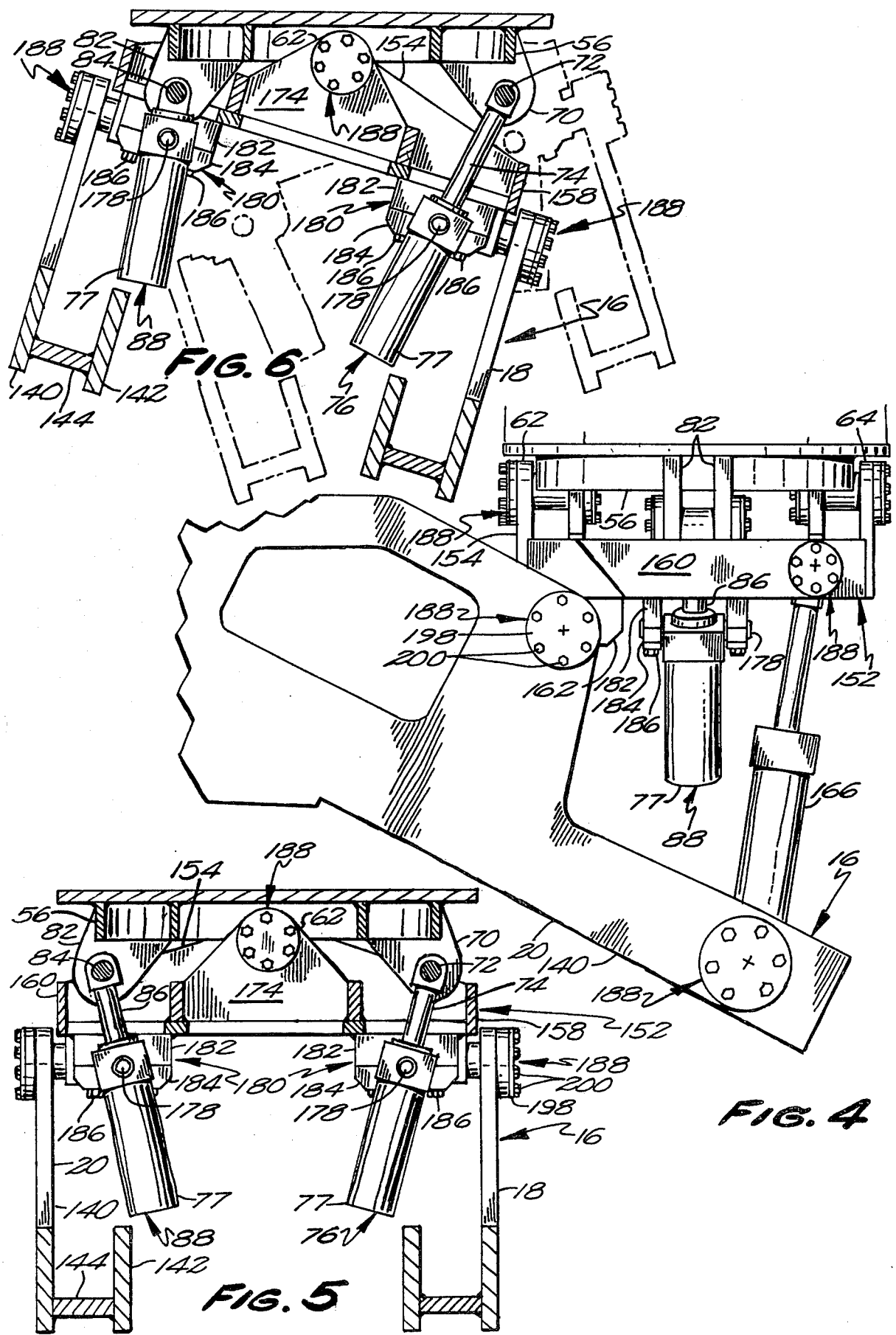

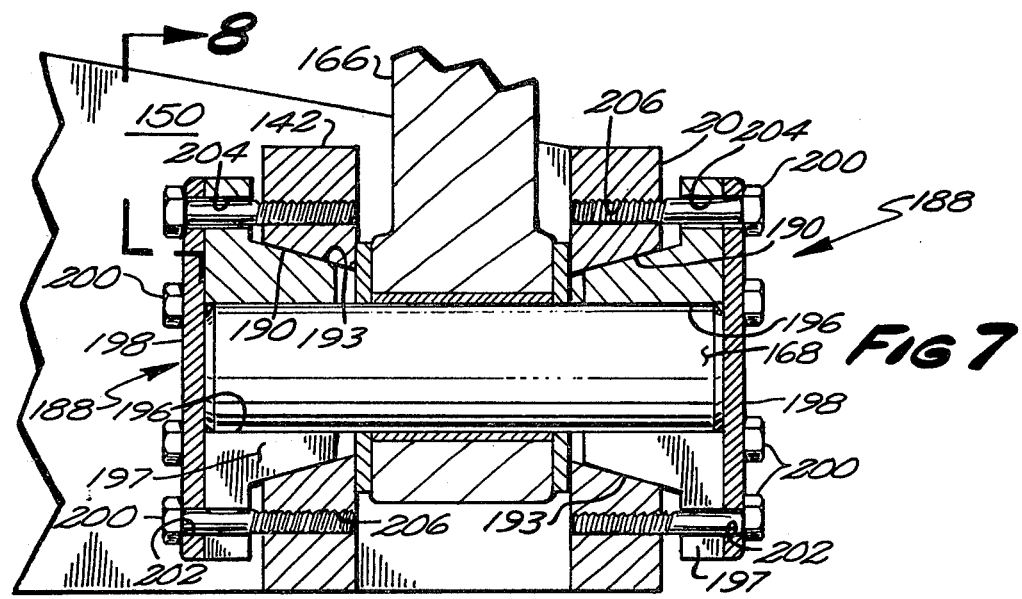
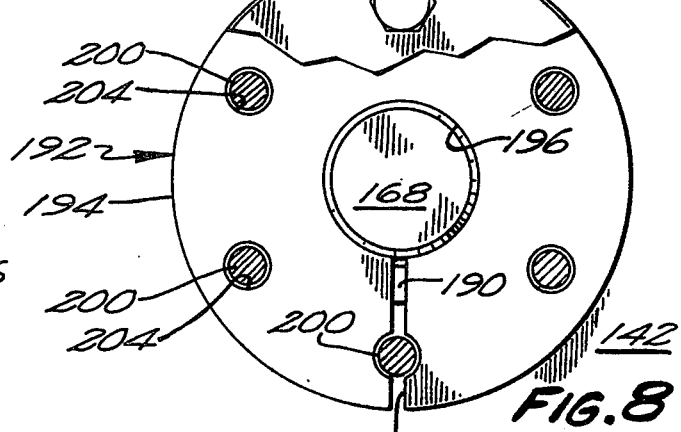
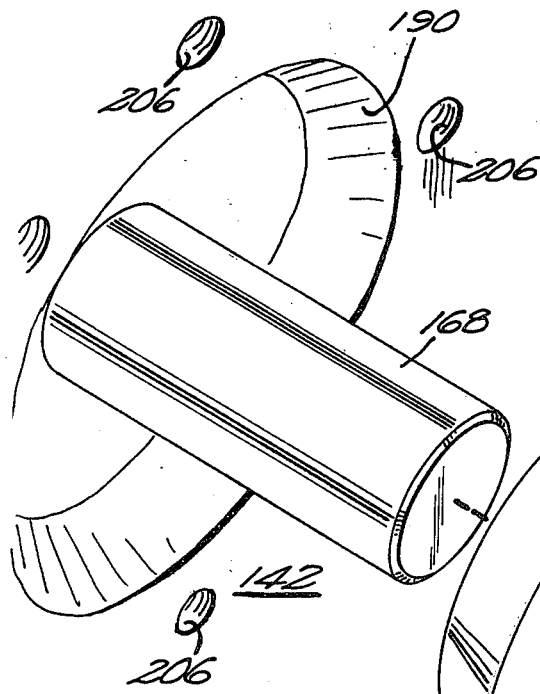

PIVOT PIN ASSEMBLY

BACKGROUND

The present invention relates generally to pivot pins, more specifically to pivot pin locations, and most specifically to a pivot pin assembly.

When two members are pivotally related by a pivot pin secured to one of the pivotal members while the other member is rotatable on the pivot pin, high stress is placed upon the pin and pivot areas. Thus, the pivot pins, the apertures cut through the pivot pin support members, and other areas are very prone to wear causing undesirable play between the pivoting members. To reduce or eliminate this wear, prior to the present invention, it has been necessary to form the apertures through which the pivot pin extend with precision and with small tolerances. Such precision formation required expensive equipment and/or precision workmanship which was thus expensive in time, labor, and equipment. Thus, prior to the present invention, manufacture was very time consuming, expensive, and resulted in the production of many reject parts because of their failure to meet the high degree of tolerances required. Thus, a need has arisen for a pivot pin assembly which can be easily manufactured, does not require high tolerances, and does not require the expensive precison equipment or the precision workmanship required of the prior pivot pin structures.

Further, in existing machines where wear had occurred around the pin and pivot pin support areas, it was often necessary to replace these areas. However, often the apertures for supporting the pivot pins were located in structural components of the machine and thus were a major component of the machine thus making replacement costly, preventing replacement in the field, and requiring extensive periods of down time. Thus, a need has arisen for a pivot pin assembly for replacing worn pin and pivot pin support areas of existing machines easily in the field, without replacement of the major structural components, and inexpensively.

SUMMARY

The present invention solves these and other problems in the prior art by providing a pivot pin assembly including in the preferred embodiment caliper-like members having first and second legs with their free ends spaced from each other. An internal bore is formed by and between the first and second legs and has a shape and size complementary to and for receipt on the outside surface of the pivot pin. The support members of the pivot pin include apertures having a shape complementary to and for receipt of the outside surface of the caliper members for causing the first and second legs to move together to grip the outside surface of the pivot pin located therebetween as the caliper-like member is being drawn into the aperture. The pivot pin assembly further includes members for drawing and removably securing the caliper-like members into the aperture of the support members.

Thus, it is an object of the present invention to provide a novel pivot pin assembly.

It is further an object of the present invention to provide such a novel pivot pin assembly which can be easily and inexpensively replaced into worn pin and pivot areas in existing machines in the field.

It is further an object of the present invention to provide such a novel pivot pin assembly which does not require the high tolerance level necessary in prior pivot pin areas.

It is further an object of the present invention to provide such a novel pivot pin assembly which can be easily manufactured, without precision equipment, and not requiring the precision workmanship of prior pivot pin locations.

It is further an object of the present invention to provide such a novel pivot pin assembly which is not prone to wear or to cause loose pivotal connection between the pivoted members.

These and further objects and advantages of the present invention will become clearer in the light of the following detailed description of an illustrative embodiment of this invention described in connection with the drawings.

DESCRIPTION OF THE DRAWINGS

The illustrative embodiment may best be described by reference to the accompanying drawings where:

FIG. 4 shows a partial side view of the device of FIG. 1.

FIG. 5 shows a cross-sectional view of the device of FIG. 1 according to section line 5—5 of FIG. 3.

FIG. 6 shows a cross-sectional view of the device of FIG. 1.

FIG. 7 shows a partial cross-sectional view of the device of FIG. 1 according to section line 7—7 of FIG. 3.

FIG. 8 shows a partial cross-sectional view of the device of FIG. 1 according to section line 8—8 of FIG. 7.

FIG. 9 shows a partial exploded perspective view of the device of FIG. 1.

Figure 1:
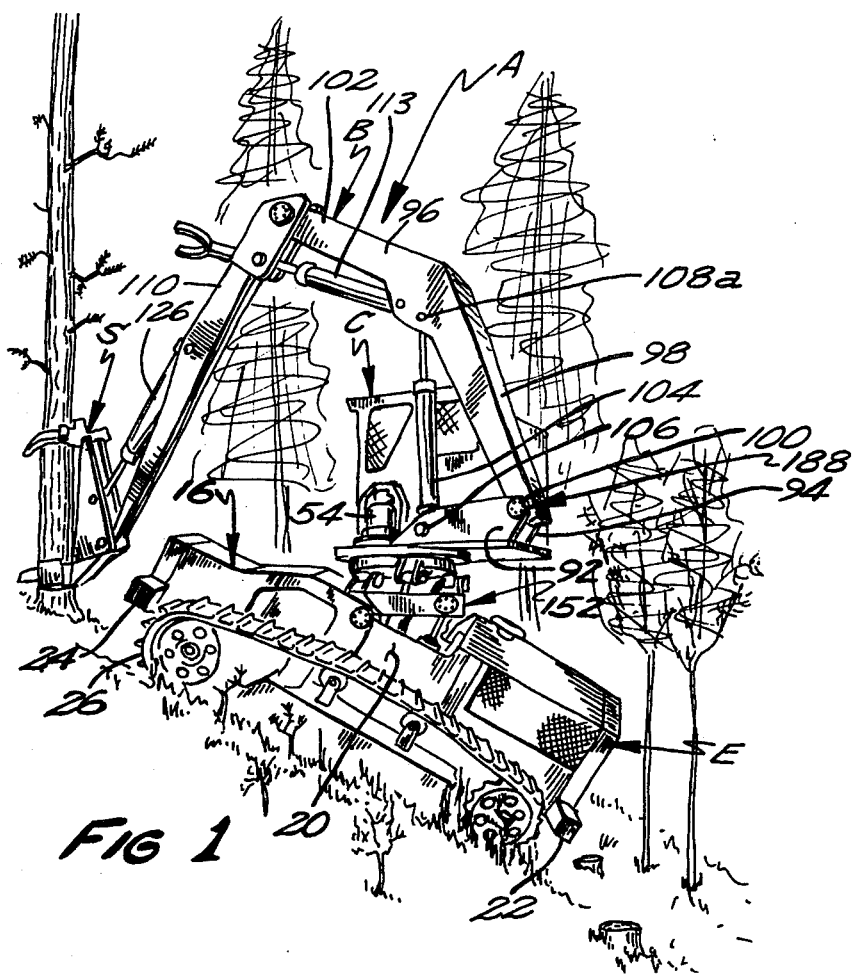
FIG. 1 shows a side elevation view of a mobile tree felling and handling device according to the teachings of the present invention.

All figures are drawn for ease of explanation of the basic teachings of the present invention only; the extensions of the figures with respect to number, position, relationship, and dimensions of the parts to form the preferred embodiment will be explained.

Where used in the various figures of the drawings herein and in U.S. Pat. No. 4,326,571, the same numerals designate the same or similar parts. Furthermore, when the terms "right", "left", "front", "back", "rear", "rear", "vertical", "horizontal", and similar terms are used herein, it should be understood that these terms have reference only to the structure shown in the drawings as it would appear to a person viewing the drawings and are utilized only to facilitate describing the invention.

DESCRIPTION

The present invention relates to an improved device for handling material, shown in its preferred form as a mobile tree felling and handling device, referred to in the trade as a "feller buncher". Such a device as invented by Patrick J. Crawford, one of the present inventors of the present invention, is disclosed in U.S. Pat. No. 4,326,571, the disclosure of which is hereby incorporated herein by reference thereto. Specifically, the components which are common to the device of U.S.

Pat. No. 4,326,571 and the present invention utilize the disclosure and numeral designation as set forth in U.S. Pat. No. 4,326,571.

Figure 3:
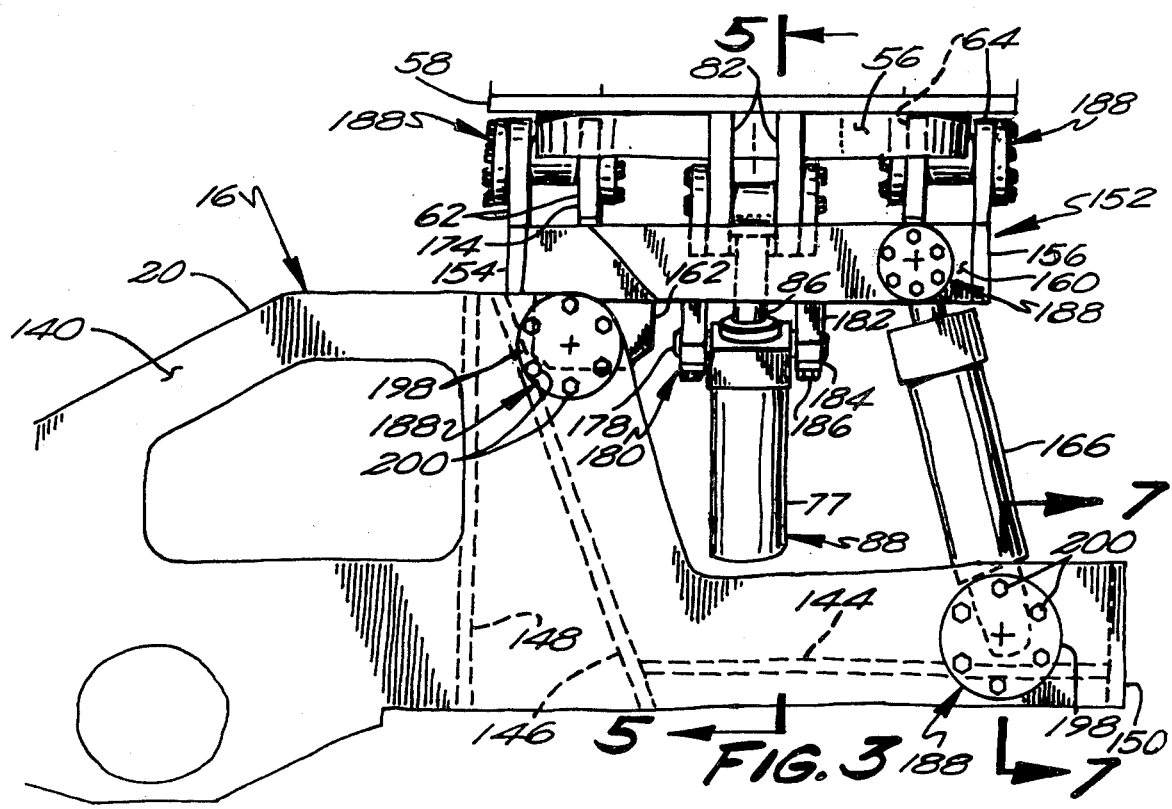
FIG. 3 shows a partial side view of the device of FIG. 1.
Figure 2:
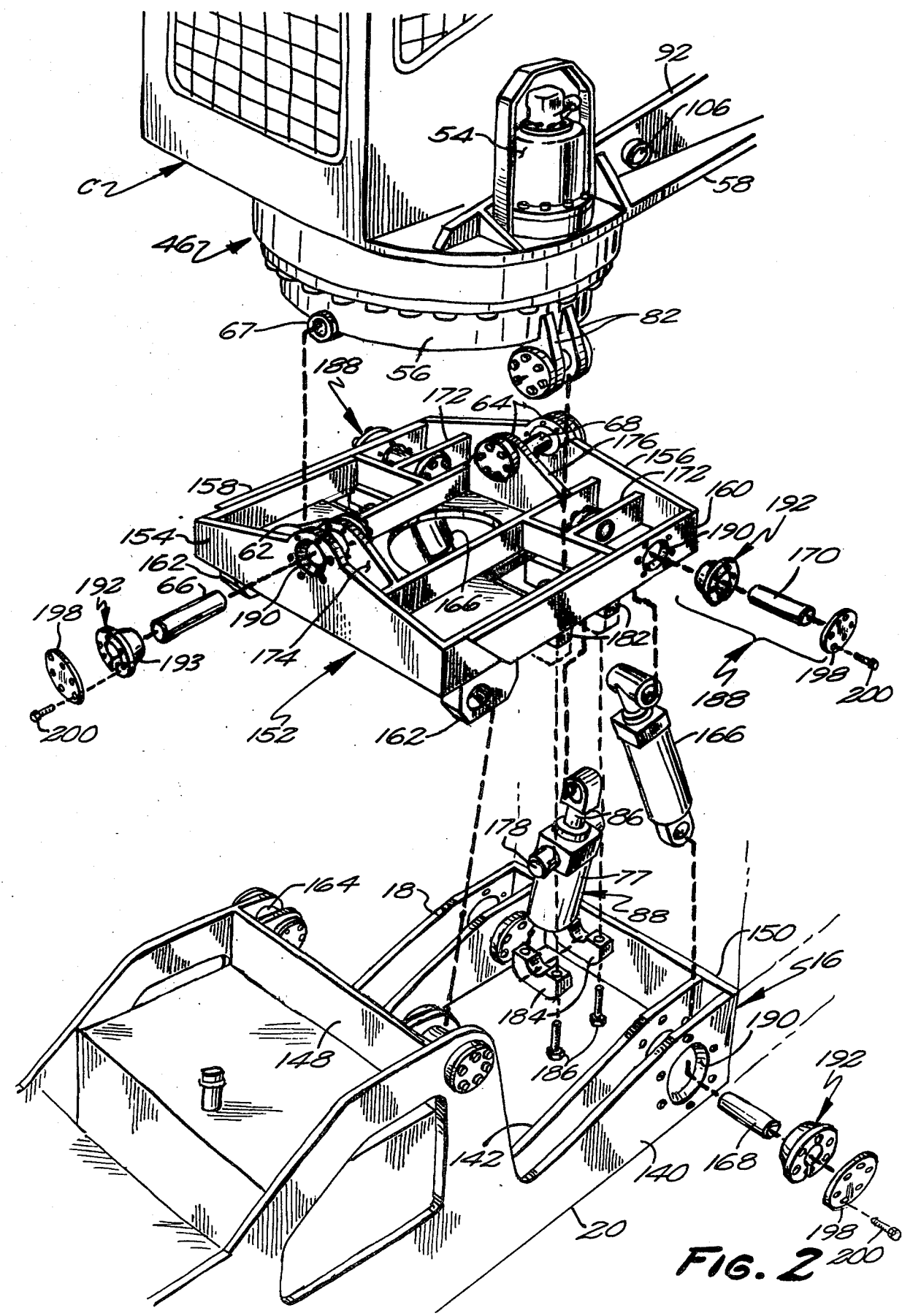
FIG. 2 shows a partial exploded perspective view of the device of FIG. 1.

Referring to the drawings in detail, an improved mobile tree felling and handling device A according to the teachings of the present invention is shown as including the longitudinally extending frame 16 having spaced longitudinal side members 18 and 20. Side members 18 and 20 generally include an outside plate 140 which extends the substantial length of frame 16 aside from the compartment for engine E and partial inside plate 142 held in a spaced relation by a bottom horizontal, longitudinal brace plate 144 and a slightly off vertical or upright brace plate 146 which intersects with one end plate 144 as best seen in FIGS. 2 and 3. Plate 142 and the portion of plate 140 corresponding to plate 142 are L-shaped having its lens at an angle corresponding to the angle of intersection of plates 144 and 146. Members 18 and 20 are held in a spaced relation by a rear plate 148 attached intermediate outer plates 140 and to the rear end of inner plates 142 of side members 18 and 20 and a front plate 150 attached to the front ends of plates 140 and 142 of side members 18 and 20.

In the preferred embodiment, device A further includes a mid-frame 152 which is generally square in shape having a front 154, a back 156, a first side 158, and a second side 160. According to the teachings of the present invention, mid-frame 152 is pivotable about an axis which is perpendicular to the longitudinal axis of device A. In its preferred form, lugs 162 are formed adjacent front 154 and generally parallel to and preferably attached to sides 158 and 160. Lugs 162 may be pivotally mounted by pins 164 mounted between plates 140 and 142 adjacent front plate 148. Pins 164 then define the pivot axis of mid-frame 152.

In the preferred embodiment, mid-frame 152 is pivoted by two hydraulic rams 166 having their lower ends pivotally attached by pins 168 mounted between plates 140 and 142 adjacent rear plate 150 and having their upper ends pivotally attached by pins 170 mounted between a brace plate 172 and sides 158 and 160 of mid-frame 152 adjacent back 156. Thus, as the piston extends and retracts within the cylinder of the rams 166, mid-frame 152 is pivoted about pins 164 defining an axis which is perpendicular to the longitudinal axis of device A. In its preferred form, the mid-frame pivot axis defined by pivot pins 164 is at the same general level in mid-frame 152 as the upper pivot axis of rams 166 defined by pivot pins 170 but located on opposite sides of mid-frame 152. Further, in its preferred form, the mid-frame pivot axis defined by pivot pins 164 is generally above the lower pivot axis of rams 166 defined by pivot pins 170 by a distance generally equal to but slightly less than the detracted length of rams 166 and is generally over from the pivot axis of rams 166 defined by pivot pins 168 by a distance generally equal to but longer than the length of mid-frame 152 between front 154 and 156. Thus, rams 166 have a slight angled or tilted relationship to frame 16 in the direction of the mid-frame pivot axis defined by pivot pins 164.

It can then be appreciated that mid-frame 152 can be pivoted about the mid-frame pivot axis defined by pivot pins 164 from a generally parallel or level relationship to frame 16 as best seen in FIG. 3 to an angular relationship to frame 16 as best seen in FIGS. 1 and 4. In its most preferred form, mid-frame 152 can be pivoted 27° about pivot pins 164. Thus, as device A is driven up an incline, mid-frame 152 can be pivoted in an angular relationship to frame 16 to thus maintain an angular or horizontal position rather than that of the incline or of the frame 16.

It should be appreciated that frame 16 constructed of parallel plates provides a frame which is easy to manufacture, is of a strong construction, maximizes material, provides strong pivot pin 164 and 168 anchor locations, and obtains other advantages. However although the construction of frame 16 as shown is advantageous and preferred, other constructions of frame 16 can be utilized with the teachings of the present invention.

Ears 62 which receive pin 66 for pivotally mounting lug 67 of roller bearing turntable 46 are formed substantially midway between sides 158 and 160 on front 154 and a parallelly disposed brace plate 174 of mid-frame 152. In a similar manner, ears 64 which receive pin 68 for pivotally mounting lug 67 of roller bearing turntable 46 are formed substantially midway between sides 158 and 160 on back 156 and a parallelly disposed brace plate 176 and in line with ears 62.

Rams 76 and 88 are pivotally mounted to mid-frame 152 adjacent sides 160 and 158, respectively, along an axis generally parallel to the axis defined by pins 66 and 68 and midway between front 154 and back 156 of mid-frame 152. In the preferred embodiment, rams 76 and 88 are trunion mounted to mid-frame 152 and specifically include pivot members or lugs 178 which extend on opposite sides of the upper end of cylinder 77 of rams 76 and 88, or in other words, adjacent the open end of cylinder 77 which reciprocally receives piston 74 and 86 of rams 76 and 88, respectively. Pivot members 178 are pivotally received by clamp members 180. Clamp members 180 include a first generally C-shaped member 182 generally attached to sides 160 and 158 substantially midway between front 154 and back 156 of mid-frame 152 and a second generally C-shaped member 184 removably secured by bolts 186 to C-shaped member 182 to thereby removably and pivotally receive pivot members 178.

It can then be appreciated that turntable 46 can be pivoted about the base portion pivot axis defined by pins 66 and 68 from a generally parallel or level relationship to mid-frame 152 as best seen in FIG. 5 to an angular relationship to mid-frame 152 as best seen in solid and in phantom in FIG. 6. In its most preferred form, turntable 46 can be pivoted 22½° about pivot pins 66 and 68 in either direction. Thus, turntable 46 can be pivoted in an angular relationship to mid-frame 152 to thus maintain a desired angular relationship to that of mid-frame 152 and frame 16.

It should further be appreciated that the angular relationship of turntable 46 to mid-frame 152 is independent of the angular relationship of mid-frame 152 to frame 16. Thus, mid-frame 152 can be positioned in any desired angle to frame 16 and/or turntable 46 can be positioned in any desired angle to mid-frame 152. Thus, turntable 46 and the material handling device and cab C mounted thereto can be positioned at any desired angle, for example, such that delimbing unit S matches that of the tree desired to be cut.

It should be appreciated that although mid-frame 152 constructed in the manner as shown and described obtains advantages including being of a compact design of strong construction, other constructions of mid-frame 152 can be utilized with the teachings of the present invention.

Device A further includes a novel pivot pin assembly 188. Assembly 188 includes a pivot pin such as pin 66, 68, 72, 164, 168, or 170 of the preferred embodiment of the present invention. The pivot pin is mounted between two generally parallel support members such as between ears 62, 64, 70, plates 140 and 142, and sides 158 and 160 and brace 172 of the preferred embodiment of the present invention. As best seen in FIG. 7, each of the side parallel members include a female tapered opening 190. Assembly 188 further includes a caliper-like member 192 having first and second legs with their free ends in a spaced relation and forming a bore for receiving the pivot pin therebetween. In the preferred embodiment, caliper-like member 192 is shown as formed by a bushing having an outside male taper 193 complementary to and for receipt in tapered opening 190, an annular flange 194, and an inside bore 196 for the slidable receipt of the pivot pin. Bushing 192 further includes a cut 197 which extends through flange 194 and taper 193 and terminates in bore 196 to split bushing 192 along a radius. Assembly 188 further includes a cover plate 198 and bolts 200. Bolts 200 extend through apertures 202 formed in plate 198 and through apertures 204 formed in flange 194 and are threadably received in apertures 206 formed in the support member. Thus, bolts 200 hold male taper 193 of bushing 192 within female taper 190 of the parallel support members and cover plate 198 against bushing 192.

Now that the structure of device A according to the teachings of the present invention has been explained, subtle features and advantages of the present invention can be set forth and appreciated. It should be appreciated that the present invention obtains the many advantages of the mobile device for handling material of U.S. Pat. No. 4,326,571 including the low center of gravity, tilting of the turntable along an axis parallel to the longitudinal direction of the frame, no requirement for a counterweight, the ability to rotate within the width of the machine, increased boom reach and capability, operator comfort, and the like and similar advantages as disclosed and incorporated herein by reference to U.S. Pat. No. 4,326,571. However, the present invention obtains further and additional advantages over prior devices including the device disclosed in U.S. Pat. No. 4,326,571.

Specifically, in addition to the ability to tilt turntable 46 along an axis parallel to the longitudinal axis of frame 16, device A according to the teachings of the present invention has the ability to tilt turntable 46 along an axis which is perpendicular to the longitudinal axis of frame 16. This ability to double tilt or obtain a "4-way tilt" results in several advantages. Specifically, device A of the present invention can operate on steep hillsides or inclines. Furthermore, device A of the present invention can operate on steep inclines with continued productivity. Specifically, device A of the present invention can operate at inclines up to 60% or 30° without a significant decrease in productivity. Prior devices to the device of the present invention and U.S. Pat. No. 4,326,571 could operate on inclines of approximately 30-35% or 15°, but productivity dropped up to 50%. Thus, the present invention is able to work on steeper inclines and also at greater levels of productivity.

Utilizing the teachings of the present invention, the swing boom can be placed at the exact angle of the tree to avoid butt fracture of the tree. Specifically, prior to the improvements of the present invention, although the device of U.S. Pat. No. 4,326,571 could be positioned such that turntable 46 was located in a horizontal position by pivoting turntable 46 about an axis parallel to the longitudinal axis of device A, the boom being at the same angular relationship as the turntable may be at an angle to the tree, especially when the boom was pivoted to the side of device A. Therefore, the tree often was forced into position of the blades of unit S causing the butt of the tree to fracture. Utilizing the present invention, turntable 46 and thus the swing booms can further pivot about an axis perpendicular to the longitudinal axis of device A so that the swing boom and delimbing unit S can be arranged to match the angle of the tree, thus reducing butt fraction of the tree.

Additionally, it was necessary to drive prior devices parallel or around an incline or hill to maintain productivity. However, utilizing the present invention, device A can be driven up an incline or hill while maintaining, and possibly increasing productivity. Further, driving up an incline or hill is safer from accidental turnover. Thus, the present invention is safer than prior devices including the device enclosed in U.S. Pat. No. 4,326,571.

Furthermore, the ability of the present invention to double tilt adds further operator comfort allowing longer working times at high productivity levels for the operator.

Thus, the present invention is clearly advantageous over devices of the prior art, including the device as disclosed in U.S. Pat. No. 4,326,571. Furthermore, the structure utilized in the present invention to obtain the "4-way tilt" is particularly advantageous. Specifically, the trunion mounting of rams 76 and 88 to a pivotal mid-frame 152 is particularly advantageous. Particularly, the structure of the present invention is able to obtain a maximum or high degree of tilt, in the preferred embodiment of the present invention a tilt of 27° is obtained in an axis perpendicular to the longitudinal axis of frame 16 and a $22\frac{1}{2}°$ tilt is obtained in an axis parallel to the longitudinal axis of frame 16, while maintaining a low machine profile. Specifically, the trunion mounting of rams 76 and 88 allows a longer stroke for pistons 74 and 86 while obtaining a very compact design. The compact design allows the center of gravity to be in a lower position to maintain or increase stability of the machine. Further, the compact design allows transport of the device A on trailers over conventional roadways and highways without disassembly. The long length of stroke for pistons 74 and 86 of rams 76 and 88 is required to obtain the degree of tilt necessary to operate on steep inclines while maintaining turntable 46 and attached structure in a relative position to the incline to obtain the many advantages of the present invention, many of which could not be obtained by small degrees of tilt such as degrees of tilt of approximately 5°-10°. For example, if rams 74 and 88 were pivotally mounted by their lower ends to mid-frame 152 in a manner as was done in the device shown in U.S. Pat. No. 4,326,571, the overall height of the device would have to be increased and/or the length of rams 74 and 88 and thus their strokes would have to be decreased, both of which are undesirable and disadvantageous. Thus, the particular construction of device A, and particularly the trunion mounting of rams 76 and 88 according to the teachings of the present invention obtains several advantages.

With respect to the pivot pin assembly 188 of the present invention, prior to the present invention it was known in the art to simply cut apertures in the parallel support members through which the pivot pin was extended. However, it was necessary to form such apertures with high or close tolerances in the parallel support members. Thus, such precision formation required expensive equipment and/or precision workmanship which was thus expensive in time, labor, and equipment. Furthermore, such apertures were prone to wear or cause wear on the pivot pins and thus causing a loose pivotal connection for the boom or other pivoting member which pivoted upon the pivot pin.

Utilizing pivot pin assembly 188 of the present invention, these disadvantages of the prior art are removed. Specifically, the pivot pin may be first inserted through bore 196 of a first bushing 192. It has been found that a wedge member placed within cut 197 to separate cut 197 may be useful in allowing insertion of the pivot pin within bore 196. The pivot pin with bushing 192 thereon may be extended through female tapered opening 190 and through the pivotal member, such as the pivot axis of the boom, until male taper 193 is received and abuts with female tapered opening 190. At that time, cover plate 198 may be positioned on bushing 192 and bolts 200 positioned through apertures 202 and 204 into apertures 206. As bolts 200 are tightened into apertures 206, bushing 192 may be drawn into opening 190 such that male taper 193 is drawn into female tapered opening 190. As male taper 193 is drawn into female tapered opening 190, cut 197 is drawn together or pinched such that the outside surface of the pivot pin is securely held and gripped in inside bore 196 of bushing 192. In a similar manner, a second bushing 192 may be positioned on the second end of the pivot pin and attached to the other of the parallel support members. It can then be appreciated that the pivot pin is held in a very rigid, non-wearing manner by pivot pin assembly 188 of the present invention. Further, due to the present design, the components of pivot pin assembly 188 can be manufactured at very low or loose tolerances. Thus, the manufacture of pivot pin location can be easily performed.

It should be appreciated that female tapered opening 190 can be formed in a hub-like manner for installation in existing pivot pin locations. Specifically, in existing machines where it is desired to replace the pivot pins, such as where wear has occurred in the pivot pins or the pivot pin apertures, the pivot pin apertures can be cut out sufficient to receive a hub member which is then welded into the parallel members. The hub-like member then includes the female tapered opening 190 for receiving male taper 193 of bushing 192 in a similar manner as set forth. Thus, worn pivot pin locations on existing devices can be easily replaced in the field at minimal expense utilizing pivot pin assemblies 188 of the present invention.

Now that the basic teachings of the present invention have been explained, many extensions and variations will be obvious to one having ordinary skill in the art. For example, although device A has been shown and described in relation to a mobile device for felling and handling trees, the teachings of the present invention can be utilized on other material handling devices for handling items of various natures such as dirt, containers, machines, etc. Likewise, although pivot pin assembly 188 has been described for use in a mobile device for felling and handling trees, the teachings of the present invention can be applied to other material handling devices or apparatus including a first member which is pivotally mounted to a second member about a pivot pin.

Thus since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims rather than by the foregoing description, and all changes which come within the meaning and range of equivalency of the claims are intended to be embraced therein.

What is claimed is:

1. A pivot pin assembly for holding a pivot pin between first and second support members, with the pivot pin having a diameter, an outside surface, a first end, and a second end, with the first and second support members being in a generally parallel, spaced relation and having an inside surface and an outside surface, comprising, in combination: a first caliper-like member having an outside surface and including first and second legs having their free ends spaced from each other, with the first member including an internal bore formed by and between the first and second legs and having a shape and size complementary to and for receipt on the outside surface of the pivot pin adjacent the first end; means for causing the first and second legs of the first member to move together to grip the outside surface of the pivot pin adjacent the first end comprising: an aperture formed in the first support member having a shape complementary to and for receipt of the outside surface of the first member, with the aperture in the first support member being internally tapered with its diameter on the outside surface of the first support member being larger than its diameter in the inside surface of the first support member, and means for drawing and removably securing the first member into the aperture of the first support member; a second caliper-like member having an outside surface and including first and second legs having their free ends spaced from each other, with the second member including an internal bore formed by and between the first and second legs and having a shape and size complementary to and for receipt on the outside surface of the pivot pin adjacent the second end; and means for causing the first and second legs of the second member to move together to grip the outside surface of the pivot pin adjacent to the second end comprising: an aperture formed in the second support member having a shape complementary to and for receipt of the outside surface of the second member, with the aperture in the second support member being internally tapered with its diameter on the outside surface of the second support member being larger than its diameter in the inside surface of the second support member, and means for drawing and removably securing the second member into the aperture of the second support member.

2. The pivot pin assembly of claim 1 wherein the first and second members are bushings including the internal bore, with the first and second legs being formed by a cut extending from the outside surface and terminating in the internal bore of the bushing.

3. The pivot pin assembly of claim 1 or 2 wherein the drawing and removably securing means comprises, in combination: a flange formed on the caliper-like member; and bolts extending through the flange and into the support member.

4. The pivot pin assembly of claim 3 further comprising, in combination: a cover plate for covering the flange and the caliper-like member, with the bolts extending through the cover plate, through the flange, and into the support member.

5. A pivot pin assembly for holding a pivot pin between first and second support members, with the pivot pin having a diameter, a cylindrically shaped outside surface, a first end, and a second end, with the first and second support members being in a generally parallel, spaced relation and having an inside surface and an outside surface, comprising, in combination: a first gripping member including a frusto-conical shaped, male tapered portion including a first end having a diameter and a second end having a diameter, with the diameter of the first end of the male tapered portion being larger than the diameter of the second end of the male tapered portion, an annular flange having a diameter which is larger than the diameter of the first end of the male tapered portion, with the annular flange being integrally connected to the first end of the male tapered portion, and an inside bore extending axially through the male tapered portion and the annular portion for the slideable receipt on the outside surface of the pivot pin, and at least a first cut extending through the male tapered portion and terminating in the bore to split the first gripping member along a radius; a first internally tapered aperture formed in the first support member having a shape complementary to and for receiving the male tapered portion of the first gripping member; bolts extending through the annular flange of the first gripping member at locations radially outward from the male tapered portion for drawing and removably securing the first gripping member into the aperture of the first support member for pinching the cut allowing the inside bore to grip the outside surface of the pivot pin adjacent the first end; a second gripping member including a frusto-conical shaped, male tapered portion including a first end having a diameter and a second end having a diameter, with the diameter of the first end of the male tapered portion being larger than the diameter of the second end of the male tapered portion, an annular flange having a diameter which is larger than the diameter of the first end of the male tapered portion, with the annular flange being integrally connected to the first end of the male tapered portion, and an inside bore extending axially through the male tapered portion and the annular portion for the slideable receipt on the outside surface of the pivot pin, and at least a first cut extending through the male tapered portion and terminating in the bore to split the second gripping member along a radius; a second internally tapered aperture formed in the second support member having a shape complementary to and for receiving the male tapered portion of the second gripping member; and bolts extending through the annular flange of the second gripping member at locations radially outward from the male tapered portion for drawing and removably securing the second gripping member into the aperture of the second support member for pinching the cut allowing the inside bore to grip the outside surface of the pivot pin adjacent the second end.

6. The pivot pin assembly of claim 5, further comprising, in combination: a first circular cover plate for covering the first gripping member and the first end of the pivot pin, with the bolts extending through the first cover plate, through the annular flange of the first gripping member, and into the first support member; and a second circular plate for covering the second gripping member and the second end of the pivot pin, with the bolts extending through the second cover plate, through the annular flange of the second gripping member, and into the second support member.

* * * * *